July 18, 1933.   H. D. GEYER   1,918,532
MOLDING PRESS
Filed May 2, 1930   4 Sheets-Sheet 1

July 18, 1933.  H. D. GEYER  1,918,532
MOLDING PRESS
Filed May 2, 1930  4 Sheets-Sheet 2

Inventor
Harvey D. Geyer
By Spencer, Hardman & Fehr
his Attorneys

July 18, 1933.  H. D. GEYER  1,918,532
MOLDING PRESS
Filed May 2, 1930  4 Sheets-Sheet 3

Inventor
Harvey D. Geyer
By Spencer Hardman & Fehr
His Attorneys

July 18, 1933.　　　H. D. GEYER　　　1,918,532
MOLDING PRESS
Filed May 2, 1930　　　4 Sheets-Sheet 4

Inventor
Harvey D. Geyer
By Spencer Hardman & Fehr
His Attorneys

Patented July 18, 1933

1,918,532

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

MOLDING PRESS

Application filed May 2, 1930. Serial No. 449,209.

This invention relates to heavy molding presses for molding articles from a relatively stiff plastic compound, especially a hot plastic compound of bituminous materials and fibrous materials.

In my copending application Serial No. 210,183, filed August 2, 1927, there is disclosed a molding press for molding a plurality of storage battery boxes at one time and using a common pressure chamber for originally receiving a large mass of hot compound and extruding this material into the plurality of separate mold cavities through narrow gates.

This present application discloses various important improvements over the molding press of said prior application, the general method of operation however being the same.

An important feature of this invention over the disclosure of said prior application is the mechanism for molding relief lettering or ornamentation in the molded article and providing a relatively movable cavity wall having the embossed molding surface thereon, whereby the general method of withdrawing the molded article from the mold as disclosed in said prior application may be retained.

Another feature of this invention is the air escape valve and the particular location thereof whereby the air entrapped in the mold cavity may escape therefrom as the cavity is filled with molding material. This air escape valve is closed immediately upon contact therewith of the entering molding material whereby said material is prevented from partially entering said valve and blocking up its passages. This air valve is mounted upon the relatively slideable cavity wall and automatic means are provided for positively opening said valve after each molding operation whereby chance sticking in closed position of said valve is positively prevented. This automatic means is actuated in a simple manner by the sliding movement of the slidable wall relative to other stationary portions of said mold.

Another feature of this invention is the relatively wide flat extrusion gates of tapered depth leading from the pressure chamber to each molding cavity. By having a gate of greater depth on one side than the other more plastic material is caused to enter the cavity at one end than the other and hence the "flow line" where the entering material meets on the opposite side of the cavity core after passing around opposite ends thereof will be off center, that is, it will be nearer one end of the molded box than the other. By proper proportioning the non-uniform depth of the gate this "flow line" may be made to occur at or near the junction of one partition and side wall of the battery box whereby the weakness due to this "flow line" may be overcome to a large extent.

Further objects and advantages of the present invention will be apparent from the following description, reference being had to the accompanying drawings, wherein a preferred embodiment of one form of the present invention is clearly shown.

In the drawings:

Fig. 1 illustrates the main portions of a hydraulic molding press built according to this invention for molding a plurality of storage battery boxes at one time. The view is a vertical section through the center line of two diametrically disposed mold cavities, and shows all the parts in their positions at the end of the molding operation while the molded boxes are hardening while under high internal pressure in the plastic material.

Figure 4:
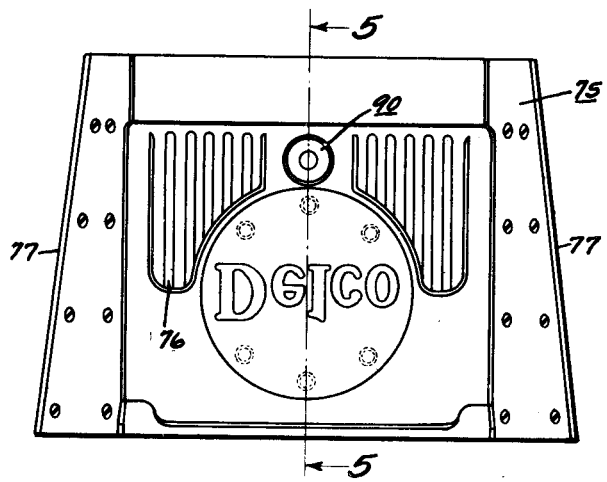
Figure 5:
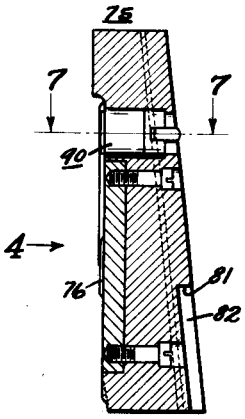
Figure 6:
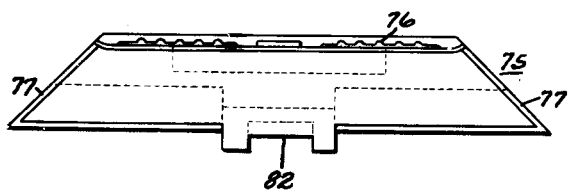

Figs. 4, 5 and 6 are detail views of the relatively slidable wall of the mold which has an embossed molding surface thereon, as clearly shown. Fig. 4 is a face view of the slidable wall looking in the direction of arrow 4 in Fig. 5. Fig. 5 is a section taken on line 5—5 of Fig. 4. Fig. 6 is a bottom view of Fig. 4.

Figure 7:
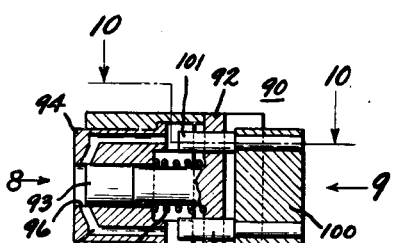

Figs. 7, 8, 9 and 10 are detail views of the air escape valve. Fig. 7 is a horizontal section through the air valve taken on line 7—7 of Fig. 5.

Figure 8:
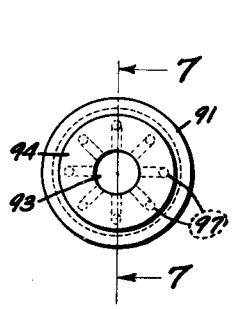

Fig. 8 is the inner end view taken in the direction of arrow 8 of Fig. 7.

Figure 9:
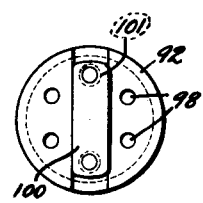

Fig. 9 is the outer end view looking in the direction of arrow 9 of Fig. 7.

Figure 10:
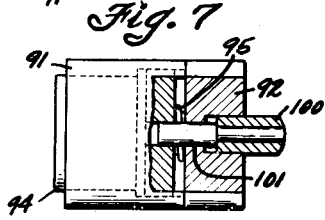

Fig. 10 is a view taken on line 10—10 of Fig. 7.

Figure 11:
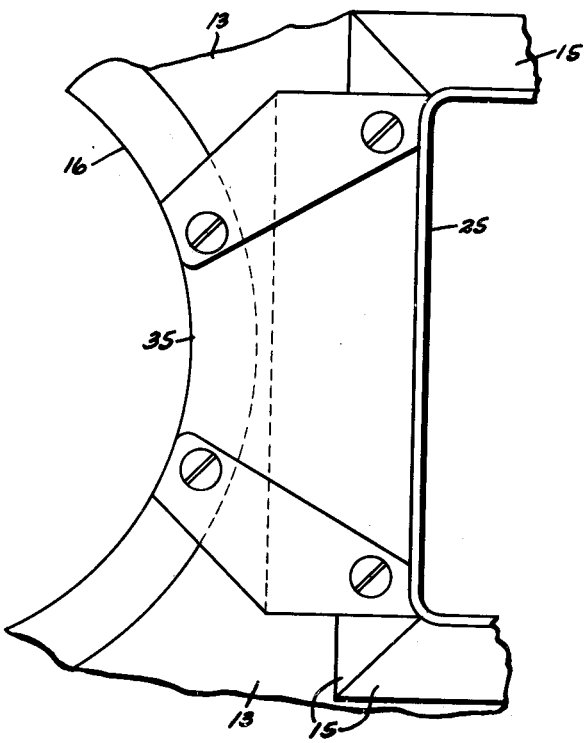
Figure 12:
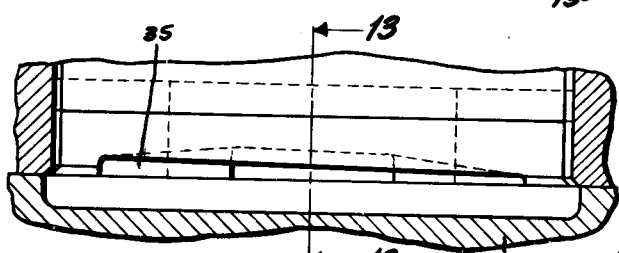
Figure 13:
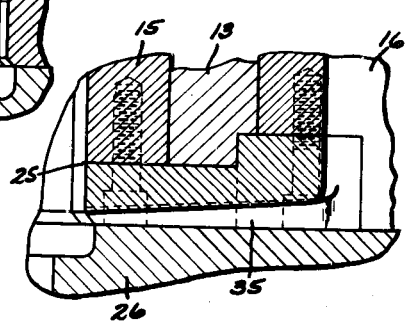

Figs. 11, 12 and 13 are enlarged detail views showing one of the extrusion gates. Fig. 11 is a view looking up in the direction of arrow 11 in Fig. 3.

Fig. 12 is a view looking endwise at the extrusion gate in the direction of arrow 12 in Fig. 11.

Fig. 13 is a vertical section on line 13—13 of Fig. 12.

Figure 14:
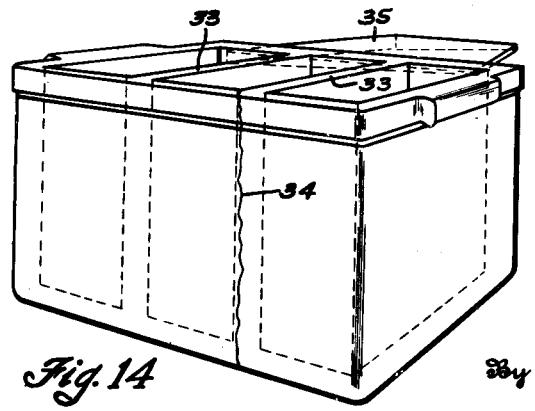

Fig. 14 is a perspective view of the molded box showing the "flow line" in the side wall opposite one of the partitions.

Similar reference characters refer to similar parts throughout the several views.

Numeral 10 marks the main or stationary platen of a large hydraulic press and is held in fixed position by four large posts 11 and the nuts 12 thereon. This stationary platen 10 has the mold-carrying plate 13 rigidly fixed thereto on its under side by any suitable means such as bolts and screws. Mold-carrying plate 13 has the stationary sections 15 of the four battery box molds rigidly mounted in four recesses therein as clearly shown in Figs. 1 to 3. Extending through the center of platen is the central cylinder 16, hereinafter termed the "pressure cylinder" since the plastic material to be molded is put under high pressure by means of this cylinder 16 and its ram.

Figure 1:
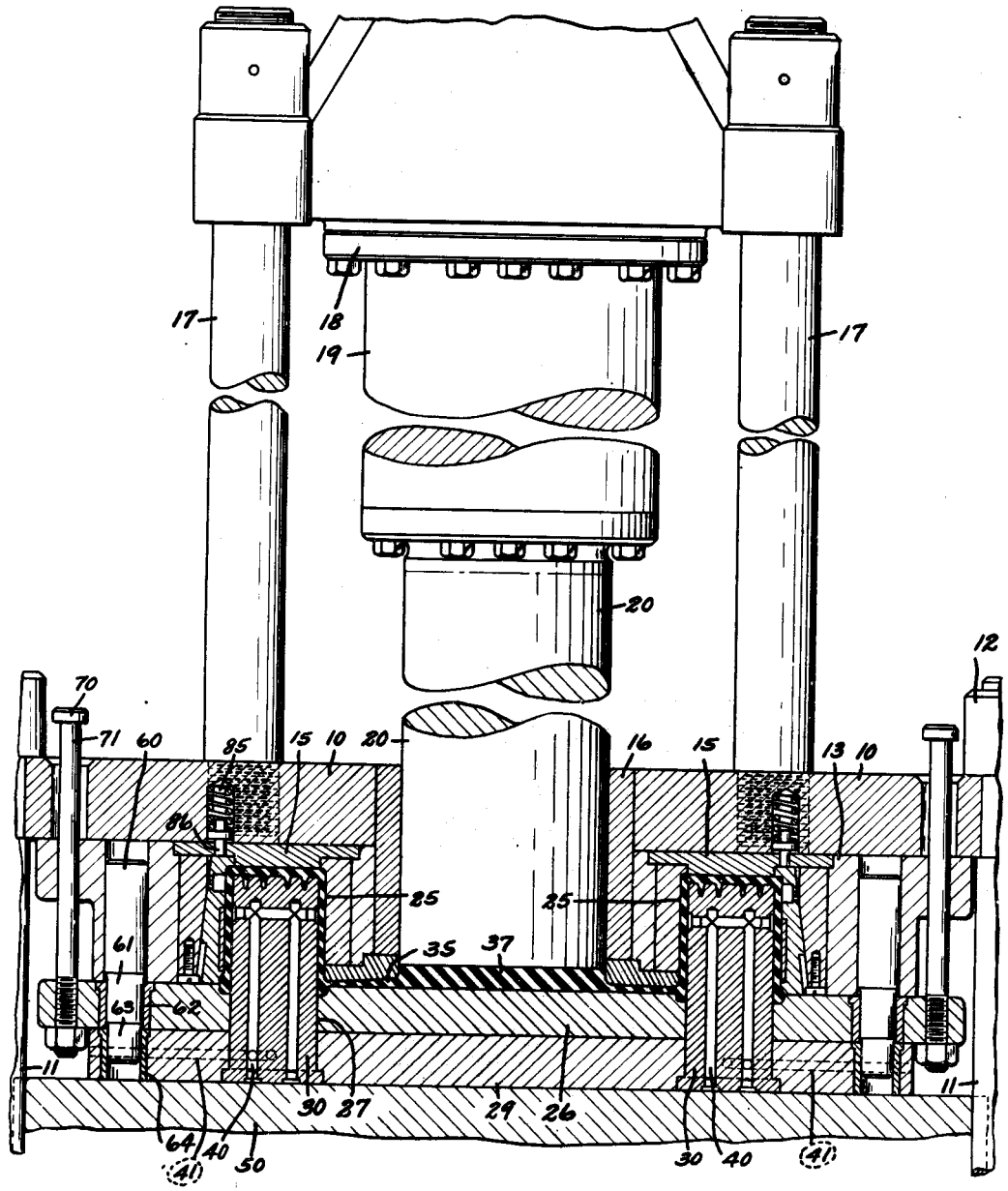

Four posts or tie rods 17 are mounted upon stationary platen 10, such as by being threaded thereinto as shown in Fig. 1, and support at their upper end a hydraulic cylinder 18 (shown only partially in Fig. 1) which is aligned with the pressure cylinder 16 therebelow. This hydraulic cylinder 18 has a hydraulic piston 19 and bolted to the lower projecting end of piston 19 is the relatively long pressure ram 20 which is adapted to be projected down into and through cylinder 16 by the hydraulic piston 19. The diameter of cylinder 18 being larger than that of cylinder 16 the pressure exerted by ram 20 upon the plastic material in cylinder 16 is greater than the hydraulic pressure within cylinder 18 inversely as the square of the respective diameters.

In the press shown in the drawings there are four mold cavities 25, each pair being diametrically spaced as shown in Fig. 1. These cavities of course correspond to the outside form of the molded boxes. The lower movable plate 26, hereinafter termed the "stripper plate", has a small portion of each mold cavity 25 formed therein and thus this plate 26 comprises the lower mold section for the four molds. This stripper plate 26 has rectangular apertures 27 therein through which project the removable box cores 30 which are properly located within cavities 25 when the core-carrying plate 29, to which cores 30 are rigidly fixed, abuts the under surface of plate 26, as shown in Fig. 1. These cores 30 are properly grooved, as at 31, to form the desired short webs 32 and the division walls 33 of the battery boxes (see Figs. 3 and 14).

The relatively wide flat tapered extrusion outlets or gates 35 interconnect each of the mold cavities 25 with the lower end of pressure cylinder 16, so that when stripper plate 26 is in its cavity closing position shown in Fig. 1 these gates 35 form restricted passages leading from cylinder 16 to said mold cavities. When the plastic material is compressed under high pressure in cylinder 16 by ram 20 it is extruded through these gates 35 to completely fill each of the mold cavities, all the parts then being in the position shown in Fig. 1. Preferably these gates 35 are shaped approximately as shown in Figs. 11, 12 and 13, and have their most restricted portion spaced slightly from the wall of the battery box so that when the molded boxes are all removed from the press still attached to the flash portion 37 by the necks 38 (which are formed by the plastic material hardening in the cylinder 16 and gates 35 respectively) these necks 38 may be easily cut or broken off at point 36 (see Fig. 3). The shape and dimensions of the gates 35 depends upon the shape and size of the article being molded and the point thereon which connects with the gate. In molding the ordinary automobile storage battery boxes having three cells therein from the hot, stiff bituminous plastic compound described in my copending application Serial No. 169,669, filed Feb. 19, 1927, I have obtained very good results with a gate 35 which is substantially the full width of the long side of the battery box and which tapers in depth uniformly from a depth of one-eighth inch on one side to a depth of three-sixteenths inch on the other side at the neck portion 36 thereof where it adjoins the box (see Fig. 12).

The purpose of providing a gate 35 having a greater depth on one side than the other is to cause more material to enter the mold cavity 25 at one end than the other. By this means when the cavity is finally filled with material the "flow line" 34 where the entering material meets on the opposite of the core 30 after passing around opposite ends thereof will occur along or closely adjacent to a junction of a partition 33 and side wall of the box rather than at the center line of the box (see Fig. 14). Such "flow lines" have been found to be quite often a line of weakness in the molded boxes. Hence it is desired to make these "flow lines" occur at or near the junction of a cell partition 33 and side wall where the side wall will be reinforced to a great extent by the partition. It has been found that by tapering the depth of the extrusion gate 35 the "flow line" 34 can be made to occur substantially in line with one of the box partitions 33 or so close to the junction of the partition and side wall that the box is greatly strengthened due to substantial elimination of this line of weakness.

Proceeding with the description of the molding press, 50 designates a lower reciprocating platen guided in its vertical movement by the posts 11 (see Fig. 1). This platen 50 is preferably mounted upon and moved by a lower hydraulic ram and cylinder (not shown) but which may be of any well known type and construction. The core-carrying plate 29 is rigidly fixed to lower platen 50 by suitable means as screws or bolts, hence the cores 30 are fixed to platen 50 and move therewith.

Figure 2:
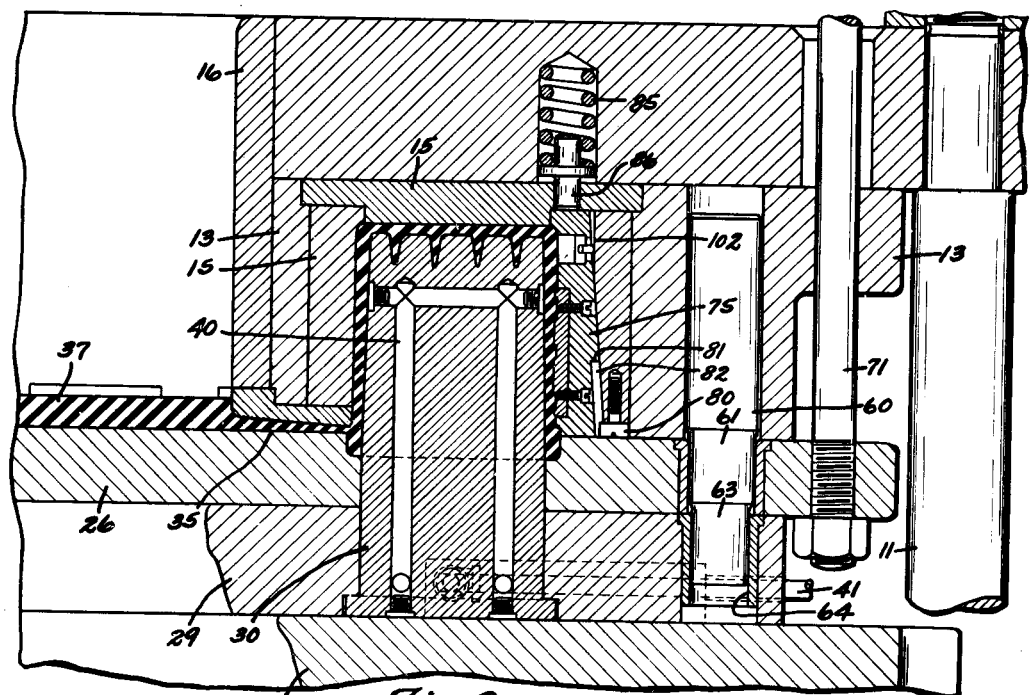
Fig. 2 is a view on a larger scale of a portion of Fig. 1 for clearer illustration of certain features.

The stationary mold-carrying plate 13 has two depending locating pins 60 rigidly fixed thereto. These pins 60 have portions 61 having a snug sliding fit within the registering holes 62 in stripper plate 26 and portions 63 having snug sliding fit within holes 64 in the core-carrying plate 29. Preferably holes 62 and 64 have suitable wear-reducing bushings fixed therein as illustrated. Thus the locating pins 60 serve to positively locate the stripper plate 26 and core-carrying plate 29 in their exact correct position when the parts are in closed position as shown in Figs. 1 and 2.

The general operation of the molding press is as follows: Beginning with the parts in position as shown in Fig. 1 but with pressure ram 20 raised to its "up" position where its bottom surface is at the line 20' in Fig. 1, a sufficient amount of hot plastic material to form all four battery boxes and have a small excess left in pressure cylinder 16 is transferred from a nearby kneading machine or storage oven to the cylinder 16. Preferably this charge of hot plastic material is in one large, unshaped hunk and is simply dropped into cylinder 16. Ram 20 is then caused to descend and force the charge within cylinder 16 to flow under high pressure through the four gates 35 into the four mold cavities 25 until said cavities are completely filled under very high internal pressure. This extrusion of the fiber-containing plastic material through the restricted gates 35 thoroughly mixes and heats the material just as it enters the mold cavity with the result that the asbestos or other fibers in the material are thoroughly coated over with the bituminous binder and the resultant molded article will not have fiber particles exposed on the surface thereof but will have a very smooth neat appearing surface as it comes from the mold. It is found also that this extrusion through the restricted gates 35 so thoroughly breaks up any hardened skin on the plastic material due to previous surface cooling of the hunk that the surface of the molded article is not marred by the presence of small particles of such previously hardened skin. There may be other reasons why this extrusion method of molding fiber-containing bituminous compounds produces better appearing and stronger molded articles than is produced by ordinary methods of molding. But whatever reasons there may be or whatever theories may be advanced the fact remains that this extrusion method does uniformly produce excellent molded articles.

After the four cavities 25 are filled the excess plastic material of the charge remains in cylinder 16 and by this means high internal pressure in the material is transmitted to the material in all four cavities 25. This internal pressure in the material preferably ranges from 4,000 pounds to 10,000 pounds per square inch, the higher the pressure the stronger and smoother are the molded articles obtained. The molded boxes quickly set and harden by cooling while being kept under high pressure. Preferably cooling water passages 40 are provided in the cores 30 so that cooling water may be circulated through said cores to expedite the setting and hardening of the boxes after each molding. Cooling water may be led into from the passages 40 through the ducts 41 to which flexible hose (not shown) may be suitably attached in a well known manner.

During the molding operation the stripper plate 26, which in fact forms the lower mold section, and the cores 30 are held forced upwardly in the position shown in Fig. 1 by the lower platen 50 which is forced upward by the lower hydraulic cylinder (not shown) with a force greater than the total down force on the four cores 30 and the plate 26 due to the internal pressure in the plastic material.

Figure 3:
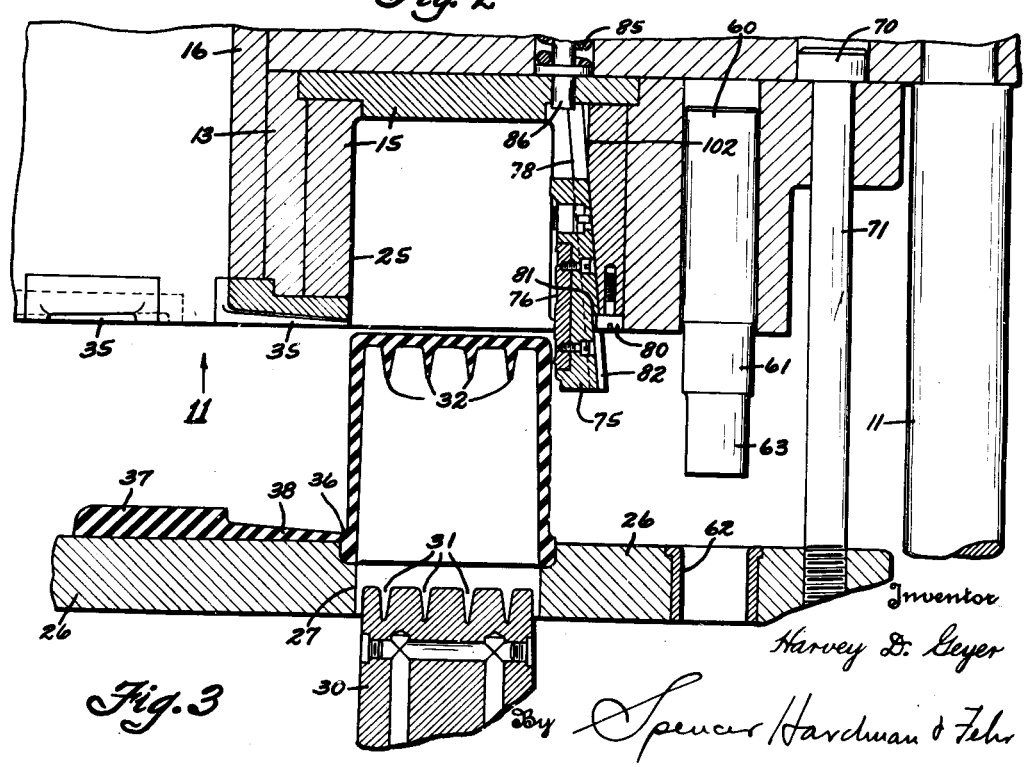
Fig. 3 is a view similar to Fig. 2 but shows the position of the parts after the mold sections are separated and the cores withdrawn from the molded battery boxes by their downward movement.

After the molded boxes have sufficiently set, ordinarily in three to five minutes, the up force on platen 50 is released, whereupon the ram 20, acting on the now hardened flash portion 37 remaining in cylinder 16, will force the stripper plate 26 together with cores 30 and their carrying plate 29 and platen 50 downward. The molded boxes have a tendency to shrink tightly upon their cores 30 and hence the four molded boxes will be pulled from their cavities 25 while yet attached to the flash portion 37 by the four necks 38, which also are pulled from the recesses or gates 35 by the down movement of flash portion 37 and the molded boxes. The ram 20 moves the stripper plate 26 down approximately to its position shown in Fig. 3, where the stripper plate's down motion is halted by the engagement of the heads 70 of the four support rods 71 with the top of mold-carrying plate 13 (see Fig. 3). Next the four cores 30 are pulled downward from the molded boxes resting upon stripper plate 26 by the down movement of platen 50 which may be caused by the lower hydraulic cylinder (not shown) or by any other suitable means. Fig. 3 illustrates the down position of the cores 30 while the four boxes remain resting upon the stripper plate 26 and all four still attached to the flash portion 37 by the four necks 38. The boxes and flash portion 37 may now be removed laterally from the press as a unit, after which the separate boxes are cut or broken off at the junction of the necks therewith.

For the next molding operation, the platen 50 is moved up by the lower hydraulic cylinder and carries all the parts back to the position shown in Fig. 1, the locating pins 60 in the meantime properly locating plates 26 and 29 as will be clear from the drawings. The molds are then ready to receive the next hot charge of plastic material.

The mechanism and operation of the relatively sliding cavity wall 75 with the embossed molding surface 76 will now be described. Figs. 4, 5 and 6 are detail views of one of the sliding walls 75. Each mold cavity 25 has a relatively sliding wall 75 which forms one side wall of the cavity. Each sliding wall 75 has laterally projecting mitered sides 77 which project into corresponding fixed guide ways 78 which determine the path of movement of the sliding wall 75. The fixed guide ways 78 are inclined to the vertical so that when the wall 75 moves downward guided by the ways 78 it will be backed off or outwardly from the cavity 25, as shown in Fig. 3. The operation of the sliding wall 75 is as follows: The box is molded with wall 75 forced up and held in the position shown in Figs. 1 and 2 by the stripper plate 26. The embossed molding surface 76 molds the desired lettering or suitable ornamentation in the side of the box. Now when the molded box is withdrawn downward from cavity 25 as hereinabove described, the embossed surface 76 will cause the movable wall 75 to adhere to the molded box and thus it will be moved in a downward direction but it will be constrained by the fixed guides 78 to be simultaneously backed off from the box until the entire surface 76 clears the side of the molded box as shown in Fig. 3. At this point the down movement of the sliding wall 75 is halted by a suitable stop such as the head of screw 80 which engages the shoulder 81 at the end of groove 82. The box with the relief figures molded therein can now continue its down movement without further contact with the sliding wall 775. Preferably a strong spring 85 and plunger 86 are provided to prevent the sliding wall 75 from sticking in its up position shown in Fig. 2. The strong spring 85 is compressed when wall 75 is raised to its up position and hence when the molded box begins its withdrawal movement the plunger 86 will urge wall 75 downward with sufficient force to prevent possibility of its sticking and tending to distort or shear off the raised lettering or ornamentation molded in the box by the embossed surface 76.

The air escape valve 90 shown in detail in Figs. 7 to 10 is preferably mounted in the upper part of the sliding wall 75. This air valve 90 comprises a cylindrical body 91 and a cap 92 therefor, the cap 92 having integral therewith a central core 93. Parts 91 to 93 inclusive are held fixed within the socket provided therefor in wall 75, preferably by a pressed fit. The annular movable valve 94 is slidably mounted in the annular space between the main body 91 and the core 93 and preferably has a light coil spring 95 which urges valve 94 to its open position or toward the left as seen in Figs. 7 and 5. When valve 94 is in this position the eight air escape ports 96 are uncovered and air may escape from the mold cavity 25 through the small ducts 97 and thence through the four small holes 98 in the cap 92 (see Fig. 9). This sliding valve 94 is held open by light spring 95 until the plastic molding material practically completely fills mold cavity 25 but as soon as the molding material comes in contact with the projecting portion thereof it is immediately urged to the right or closed position, thus closing off the air ports 96 before any plastic material can enter same. It is very important that no molding material enters the small air escape ports 96 and for this reason these ports are located down within the central bore of valve 94. Obviously the molding material will press against the projecting portion of valve 94 before it reaches the ports 96 and since spring 95 is very light the valve 94 will immediately close. Since spring 95 is so weak other means must be provided to open valve 94 after each box is molded so that it may function to permit the escape of air from the cavity 25 at the next filling thereof. Such other means comprises the reciprocating cam block 100 and the two pins 101 fixed thereto which slide in corresponding holes in cap 92. Cam block 100 engages a stationary cam surface 102 (see Figs. 2 and 3) which is so shaped as to permit the closing of valve 94 when the sliding wall 75 is in its up position shown in Fig. 2, but upon the descent of wall 75, carrying cam block 100 therewith, the said cam block 100 slides along cam surface 102 which gradually forces said block to the left as seen in Figs. 2 and 3 and the inwardly projecting pins 101 engage and force the sliding air valve 94 to the left or open position shown in detail in Fig. 7. Thus the air valve 94 is positively opened during the withdrawal of each molded box and hence is prevented from sticking in closed position, which it tends to do due to the molded material being highly compressed thereagainst while each box is being molded under high pressure.

While the form of embodiment of the present invention as herein disclosed, constitutes a preferred form, it is to be understood that other forms might be adopted, all coming within the scope of the claims which follow.

What is claimed is as follows:

1. A molding press for molding and hardening articles under high pressure from a plastic compound of bituminous material, comprising: a mold having a mold cavity within which the plastic compound is highly compressed to form the molded article, means for withdrawing the molded article axially from said mold cavity, said mold cavity having a relatively slidable embossed wall movable with said article during the initial withdrawal movement thereof, and automatic means for simultaneously backing said embossed wall out of engagement with the article during said withdrawal movement, an air escape valve located in said slidable wall for permitting escape of air from said mold cavity as it is filled with molding material, and means actuated by the movement of said slidable wall for positively opening said air valve.

2. A molding press for molding and hardening articles under high pressure from a plastic compound of bituminous material, comprising: a mold having a mold cavity within which the plastic compound is highly compressed to form the molded article, means for withdrawing the molded article axially from said mold cavity, said mold cavity having a relatively slidable embossed wall movable with said article during the initial withdrawal movement thereof, and an angularly extending guide for said embossed wall causing it to back out of engagement with said article as it moves therewith, an air escape valve mounted in said slidable wall and means actuated by the relative movement of said wall for positively opening said air valve after each molding operation.

3. A molding press for molding and hardening articles under high pressure from a plastic compound of bituminous material comprising: a mold having a mold cavity within which the plastic compound is highly compressed to form the molded article, means for withdrawing the molded article from said mold, said mold cavity having a relatively slidable embossed wall movable with said article during the initial withdrawal movement thereof and an angularly extending guide for said embossed wall causing it to back out of engagement with said article as it moves therewith, an air escape valve mounted in said slidable wall and opening inwardly of said cavity, and means actuated by the relative movement of said wall for positively opening said valve during the withdrawal of the molded article.

4. A molding press for molding and hardening articles under high pressure from a plastic compound of bituminous material comprising: a mold having a mold cavity within which the plastic compound is highly compressed to form the molded article, means for withdrawing the molded article axially from said mold cavity, an air escape valve located in said mold for permitting escape of air from said cavity as it is being filled with molding material, said valve being closed automatically by pressure of the molding material thereupon during filling, and automatic positive means for opening said valve after each molding operation.

5. A molding press for molding and hardening articles under high pressure from a plastic compound of bituminous material, comprising: a mold having a mold cavity within which the plastic compound is highly compressed to form the molded article, means for withdrawing the molded article from said mold, an air escape valve located in said mold and opening inwardly of said mold cavity, said valve being closed by slight pressure of the molding material thereupon during filling of the cavity, and positive automatic means for opening said valve after each molding operation whereby to prevent said valve from sticking in closed position.

6. A molding press for molding and hardening articles under high pressure from a plastic compound of bitumen and fibrous material, comprising: a mold having a plurality of mold cavities therein, a pressure cylinder adapted to receive at one loading a sufficient amount of plastic compound to fill all of said mold cavities, extrusion gates leading from said pressure cylinder to each of said cavities, a high pressure ram for said cylinder operable to extrude said compound through said gates to completely fill all of said cavities and thereafter to maintain high internal pressure within the material until it sets and hardens, said extrusion gates being relatively wide and of small depth but having greater depth on one side thereof than the other.

7. A molding press for molding and hardening articles under high pressure from a plastic compound of bitumen and fibrous material, comprising: a mold having a mold cavity therein, a pressure cylinder for receiving the charge of plastic compound, a relatively wide flat extrusion gate leading from said pressure cylinder to said cavity, said extrusion gate having a greater sectional area at one side thereof than the other, and a high pressure ram for said cylinder operable to extrude said compound through said extrusion gate to completely fill said cavity.

8. A molding press for molding and hardening articles under high pressure from a plastic compound of bitumen and fibrous material, comprising: a mold having a mold cavity, a pressure chamber adapted to originally receive unformed plastic compound, a pressure restricting extrusion gate leading from said chamber to said cavity, pressure means operable to rapidly extrude said unformed compound under high pressure from said chamber through said gate to completely fill said cavity and thereby form the molded article, and means for withdrawing the molded article axially from the mold cavity, said mold having a relatively axially sliding cavity wall having an axially interlocking molding surface thereon and arranged to be moved axially by the molded article by said interlocking surface as it is withdrawn from said mold cavity, and guide means for simultaneously backing said embossed wall out of engagement therewith during such axial movement.

9. A molding press for molding and hardening articles under high pressure from a plastic compound of bitumen and fibrous material, comprising: a mold having a mold cavity, a pressure chamber adapted to originally receive unformed plastic compound, a pressure restricting extrusion gate leading from said chamber to said cavity, pressure means operable to extrude said unformed compound under high pressure from said chamber through said gate to completely fill said cavity and thereby form the molded article, and means for withdrawing the molded article axially from said mold cavity, said mold having a relatively sliding embossed wall movable axially by said article during a portion of its withdrawal movement, and guide means for simultaneously backing said embossed wall out of engagement with the article, whereby the axial withdrawal movement of said article may be completed.

HARVEY D. GEYER.